United States Patent
Watanabe

(10) Patent No.: US 9,075,294 B2
(45) Date of Patent: Jul. 7, 2015

(54) PROJECTOR WITH A LENS COVER THAT IS SMALLER IN THE OPEN STATE THAN IN THE CLOSED STATE

(75) Inventor: Toshimitsu Watanabe, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 42 days.

(21) Appl. No.: 13/371,843

(22) Filed: Feb. 13, 2012

(65) Prior Publication Data

US 2012/0236265 A1   Sep. 20, 2012

(30) Foreign Application Priority Data

Mar. 15, 2011   (JP) .................................. 2011-056265

(51) Int. Cl.
*G03B 21/14* (2006.01)
*G03B 21/30* (2006.01)

(52) U.S. Cl.
CPC .............. *G03B 21/145* (2013.01); *G03B 21/30* (2013.01)

(58) Field of Classification Search
CPC ........................... G03B 11/045; G11B 33/027
USPC ................... 353/61, 100, 101, 119; 352/204; 359/511
See application file for complete search history.

(56) References Cited

U.S. PATENT DOCUMENTS

| | | | |
|---|---|---|---|
| 6,279,640 B1 * | 8/2001 | Van Lennep | 160/62 |
| 6,398,327 B1 | 6/2002 | Momoze | |
| 2005/0099609 A1 * | 5/2005 | Masuzawa et al. | 353/101 |
| 2006/0126027 A1 * | 6/2006 | Shiraishi | 353/58 |
| 2006/0256299 A1 * | 11/2006 | Saito | 353/70 |
| 2007/0206163 A1 * | 9/2007 | Kuroda | 353/88 |

FOREIGN PATENT DOCUMENTS

| | | |
|---|---|---|
| CN | 1863290 A | 11/2006 |
| JP | U-3003022 | 8/1994 |
| JP | A-09-9299 | 1/1997 |
| JP | A-11-64971 | 3/1999 |
| JP | 2001-035141 A | 2/2001 |
| JP | A-2008-268716 | 11/2008 |
| JP | 2010145652 A * | 7/2010 |
| JP | A-2010-217255 | 9/2010 |

* cited by examiner

Primary Examiner — Sultan Chowdhury
Assistant Examiner — Danell L Owens
(74) Attorney, Agent, or Firm — Oliff PLC

(57) ABSTRACT

A projector modulates a luminous flux emitted from a light source in accordance with image information and projects the modulated light by a projection lens. The projector includes an exterior housing that houses the projection lens and has a projection opening through which the light exiting from the projection lens passes and a lens cover that opens and closes the projection opening, the lens cover has a first cover and a second cover, and the first cover and the second cover are configured so that they open and close the projection opening by being slid and are stacked and housed in an open state in which the projection opening is opened.

10 Claims, 10 Drawing Sheets

PROJECTOR WITH A LENS COVER THAT IS SMALLER IN THE OPEN STATE THAN IN THE CLOSED STATE

BACKGROUND

1. Technical Field

The present invention relates to projectors.

2. Related Art

In the past, a projector that modulates, in accordance with image information, a luminous flux emitted from a light source and projects the modulated light onto a screen by a projection lens has been known. Moreover, as such a projector, a projector in which a lens cover is provided so as to cover a front side of the projection lens to protect the projection lens has been known (see, for example, JP-A-2008-268716 (Patent Document 1)).

The projector described in Patent Document 1 includes an exterior housing that houses a projection optical apparatus (a projection lens) and a shielding member. In addition, the projector has, in the exterior housing, a luminous flux passage opening through which the light projected from the projection lens passes, and is so configured as to open and close the luminous flux passage opening by sliding the shielding member.

However, since the projector of Patent Document 1 requires a large space to house a light blocking member when the luminous flux passage opening is opened, the projector becomes undesirably large or limitations are imposed on the placement, the design, etc. of components in the projector.

SUMMARY

An advantage of some aspects of the invention is to solve at least part of the problems described above, and the invention can be implemented as the following forms or application examples.

Application Example 1

This application example of the invention is directed to a projector that modulates a luminous flux emitted from a light source in accordance with image information and projects the modulated light by a projection lens, and includes; an exterior housing that houses the projection lens and has a projection opening through which the light exiting from the projection lens passes; and a lens cover that opens and closes the projection opening, wherein the lens cover has an open state in which the projection opening is opened and a closed state in which the projection opening is closed, and is configured so that the lens cover in the open state is smaller than that in the closed state when viewed from the side where light exits from the projection lens.

According to this configuration, the projection opening through which the light emitted from the projection lens passes is opened and closed by the lens cover. In addition, the lens cover is configured so that the lens cover in the open state is smaller than that in the closed state when viewed from the side where light exits from the projection lens. As a result, as compared to a configuration in which the size when viewed from the side where the light exits from the projection lens is not largely varied in an open state and a closed state of a member that opens or closes the projection opening, it is possible to store the lens cover in an open state in a small space. This makes it possible to provide the projector that can efficiently dispose configurations other than the lens cover (for example, an efficient configuration of an air channel for cooling the inside of the projector and a configuration for incorporating a new function) and can realize miniaturization while making it possible to protect the projection lens when the projector is not used.

Application Example 2

In the projector according to the application example described above, it is preferable that the lens cover be configured from a plurality of members, and the plurality of members be configured so as to be stacked in the open state.

According to this configuration, the lens cover is configured from a plurality of members, and the plurality of members are configured so as to be stacked in the open state. As a result, it is possible to configure the lens cover so as to be smaller in the open state than the closed state when viewed from the side where the light exits from the projection lens, and to store the lens cover in a small space in the open state, that is, the state in which the projector is projectable.

Application Example 3

In the projector according to the application example described above, it is preferable that the lens cover have a pulling section that pulls one of the plurality of members by a slide movement of the other members.

According to this configuration, the lens cover is configured from a plurality of members and has the pulling section. As a result, it is possible to open and close the projection opening by sliding one of the plurality of members and thereby moving the other members. This makes it possible to simplify the configuration by which the lens cover is moved and enhance the usability when the projection opening is opened and closed.

Application Example 4

In the projector according to the application example described above, it is preferable that the projector further include a transmitter that outputs a light signal to a screen, and the exterior housing have a signal opening through which the light signal passes, and the lens cover in the open state is stacked at a position where the signal opening is not blocked.

According to this configuration, since the projector includes the transmitter that outputs a light signal to a screen, and the lens cover is configured so as to be stacked in the open state at a position where the signal opening through which the light signal passes is not blocked. As a result, the projector is allowed to be operated using the light signal in a state where an image is projectable to a screen.

Application Example 5

In the projector according to the application example described above, it is preferable that in the open state, the lens cover be disposed on the opposite side of the signal opening with the projection opening located between the lens cover and signal opening.

According to this configuration, in an open state, the lens cover is disposed on the opposite side of the signal opening with the projection opening located between the lens cover and signal opening. As a result, it is possible to configure the projector so as to have the transmitter with a simple structure while suppressing a growth in size without depending on the configuration of the lens cover.

Application Example 6

In the projector according to the application example described above, it is preferable that on the side where the projection opening of the exterior housing is provided, a suction port and an exhaust port for flowing air that cools the inside of the projector therethrough be disposed, and in an open state, the lens cover be disposed between the projection opening and the suction port, or the projection opening and the exhaust port.

According to this configuration, on the side where the projection opening of the exterior housing is provided, the suction port and the exhaust port are disposed. That is, the suction port and the exhaust port are formed on the same side as the side where the luminous flux exits from the projection lens, and the projector sucks in air cooling the inside thereof from the projected image side and exhausts the air to the image side. As a result, even in an installation situation in which the member is disposed in the vicinity of the side different from the image side, the projector is able to reliably cool the inside thereof without closing the suction port or the exhaust port.

Moreover, in an open state, the lens cover is disposed between the projection opening and the suction port, or the projection opening and the exhaust port.

This makes it possible to provide the projector that includes the lens cover 6 capable of being stored with space-saving and improves the degree of freedom of installation.

Application Example 7

In the projector according to the application example described above, it is preferable that the projector further include a lens shift mechanism that movably supports the projection lens in a plane that is orthogonal to an optical axis, and the lens cover be able to open or close the projection opening even in a state in which the projection lens is moved by the lens shift mechanism.

According to this configuration, the projector includes a lens shift mechanism and the lens cover is configured so as to open or close the projection opening even in a state in which the projection lens is moved. As a result, it is possible to provide the projector that is able to protect the projection lens when the projector is not used and to move the image projected on the screen while storing the lens cover in a small space.

Application Example 8

In the projector according to the application example described above, it is preferable that the lens shift mechanism have an operation section that allows the projection lens to move by a user, and the operation section be operable when the lens cover is either in an open state or a closed state.

According to this configuration, the lens shift mechanism has an operation section that moves the projection lens and the operation section is configured so as to be operable in an open state and a closed state of the lens cover. As a result, it is possible to move the projection lens not only in a state in which the projector projects the light on the screen but also in a state in which the projector does not project the light on the screen.

Application Example 9

In the projector according to the application example described above, it is preferable that the lens cover be configured so as to move inside the exterior housing to thereby open or close the projection opening.

According to this configuration, the lens cover is configured so as to move inside the exterior housing to thereby open or close the projection opening. As a result, it is possible to improve the design of the projector and prevent the lens cover from erroneously moving due to the contact of the member outside of the projector to the lens cover.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projector according to an embodiment will be described with reference to the drawings.

A projector of the embodiment modulates, in accordance with image information, a luminous flux emitted from a light source, and enlarges and projects the luminous flux onto a screen. Moreover, the projector of the embodiment is configured so as to be able to project, onto the screen, an image for a right eye as a first image and an image for a left eye as a second image by time division. Furthermore, the projector of the embodiment is configured so as to output, to the screen, a light signal synchronized with switching between the image for a right eye and the image for a left eye. Then, by wearing glasses for viewing images, the viewer who views the image projected on the screen can recognize the projected image as a stereoscopic image as a result of the glasses for viewing images being controlled by the light signal reflected from the screen.

Principal Configuration of the Projector

Figure 1:
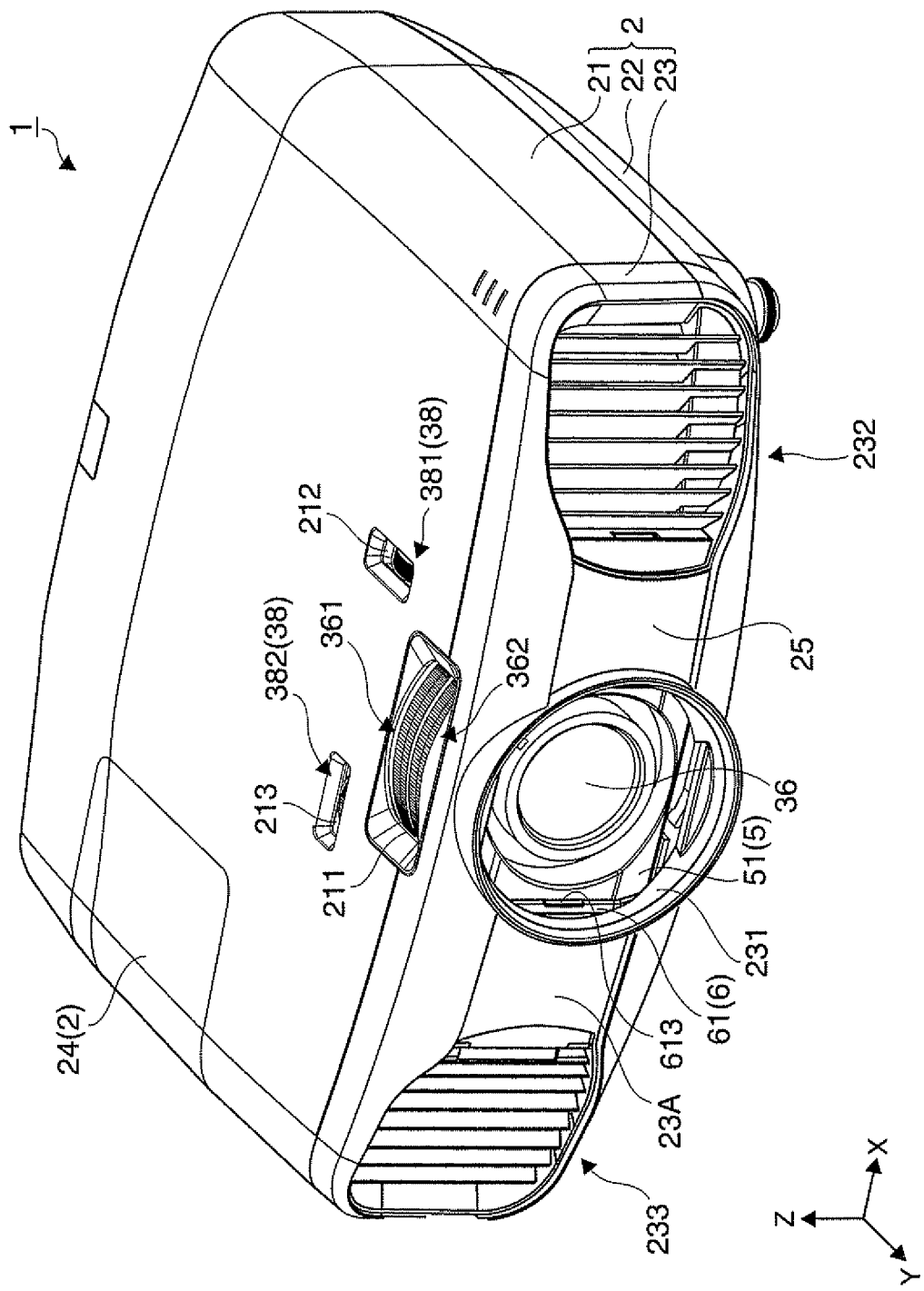
FIG. 1 is a perspective view showing the appearance of a projector of an embodiment.
Figure 2:
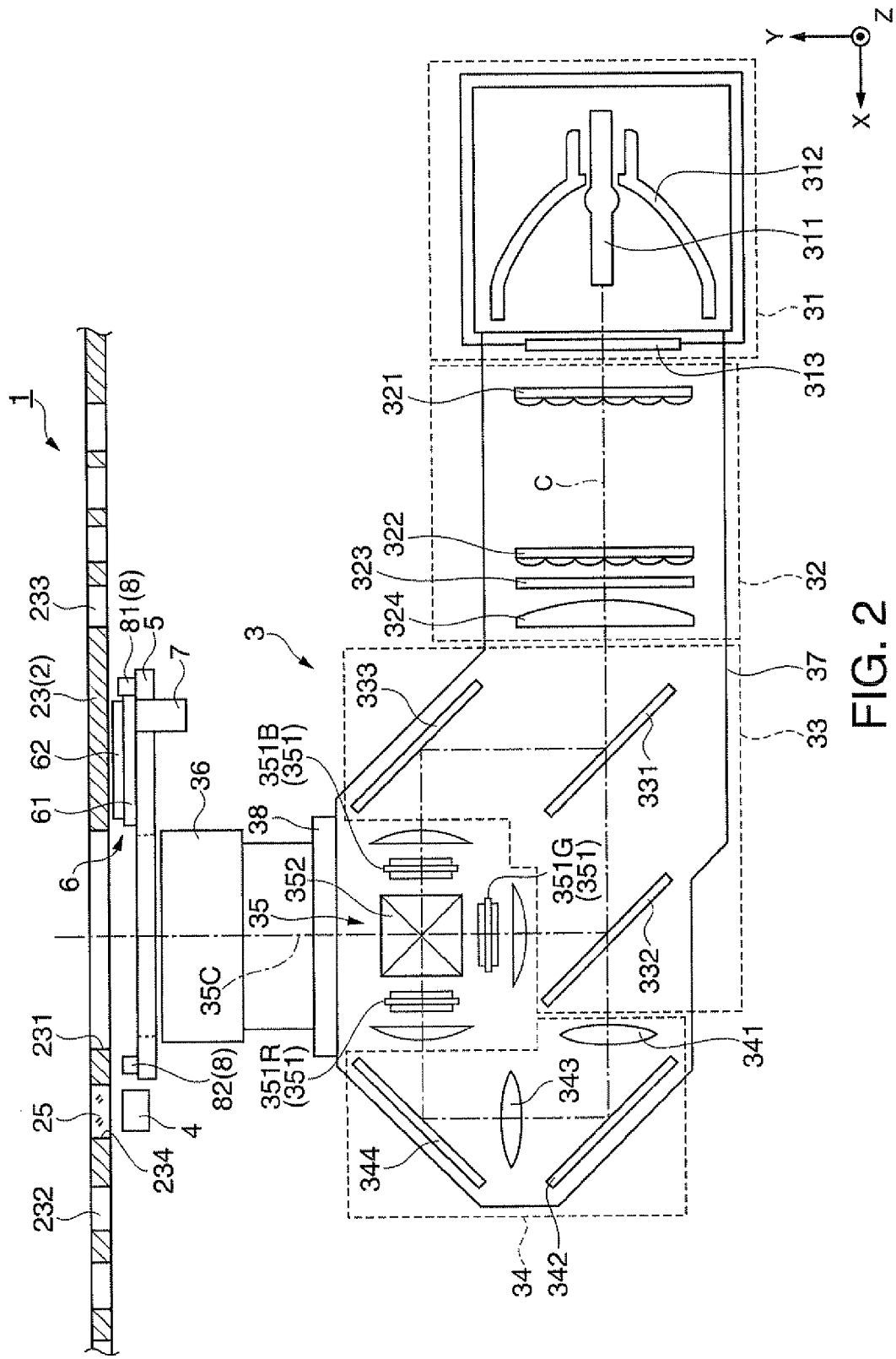
FIG. 2 is a schematic diagram showing a schematic configuration of the inside of the projector of the embodiment.

FIG. 1 is a perspective view showing the appearance of a projector 1 of the embodiment. FIG. 2 is a schematic diagram showing a schematic configuration of the inside of the projector 1.

As shown in FIGS. 1 and 2, the projector 1 includes an exterior housing 2 forming an exterior, a control section (not shown), an optical unit 3 having a light source device 31, a transmitter 4, a cover guiding section 5, a lens cover 6, a driving section 7, a detecting section 8, and the like.

Incidentally, though not shown specifically, in the exterior housing 2, a fan for cooling the inside of the projector 1, a duct that guides the air, a power supply device that supplies power to the control section, the light source device 31, etc., and the like are disposed. Moreover, hereinafter, for the sake of description, a direction in which a luminous flux is emitted from the light source device 31 is referred to as a +X direction (a rightward direction), a direction in which the light projected from the projector 1 travels is referred to as a +Y direction (a frontward direction), and an upper direction in FIG. 1 is referred to as a +Z direction (an upward direction).

The exterior housing 2 is made of synthetic resin. As shown in FIG. 1, the exterior housing 2 includes an upper case 21, a lower case 22, a front case 23, a lamp lid 24, and the like, and these components are fixed with screws etc.

As shown in FIG. 1, the upper case 21 forms an upper part of the exterior housing 2. The upper case 21 has, in a top face thereof, an opening 211 from which a zoom lever 361 and a focus lever 362 that are provided in a projection lens 36, which will be described later, are exposed. Moreover, the upper case 21 has, in the top face thereof, behind the opening 211, openings 212 and 213 from which a first dial 381 and a second dial 382, respectively, of a lens shift mechanism 38, which will be described later, are exposed. Furthermore, the upper case 21 has, in the top face thereof, an opening through which the light source device 31 is attached/detached, and this opening is closed with the lamp lid 24.

The lower case 22 forms a lower part of the exterior housing 2. On the underside of the lower case 22, foot portions (not shown) are provided so as to protrude therefrom, the foot portions that make contact with an installation surface when the projector 1 is installed on a desk or the like.

The front case 23 forms a front part of the exterior housing 2. In the center of the front case 23, as shown in FIG. 1, an opening (a projection opening 231) which is circular as viewed from the front is formed, and the projected light passes through the projection opening 231.

The front case 23 has, on the +X side of the projection opening 231, a suction port 232 through which the external air is sucked in and, on the −X side of the projection opening 231, an exhaust port 233 through which the heated air inside the exterior housing 2 is exhausted to the outside. In this manner, the suction port 232 and the exhaust port 233 are formed on the side where the projection opening 231 of the exterior housing 2 is provided, and allow the air that cools the inside of the projector 1 to flow therethrough.

The suction port 232 and the exhaust port 233 have shapes which are similar to each other as viewed from the front, and, in areas inside the exterior housing 2 corresponding to the inside of the suction port 232 and the exhaust port 233, unillustrated suction duct and exhaust duct are disposed.

Moreover, in the front case 23, as shown in FIG. 2, an opening (a signal opening 234) is formed on the +X side of the projection opening 231 (between the projection opening 231 and the suction port 232). The light signal output from the transmitter 4, which will be described later, passes through the signal opening 234.

The signal opening 234 is closed with an optical filter 25.

As the optical filter 25, polycarbonate resin through which the light signal output from the transmitter 4 passes, the polycarbonate resin preventing the passage of a visible light in a wavelength region which is different from the wavelength region of the light signal, is adopted, and the optical filter 25 is configured so that the transmitter 4 is not easily seen from the outside of the projector 1. Incidentally, as the optical filter 25, any materials other than the polycarbonate resin may be used as long as the materials transmit the light signal output from the transmitter 4.

Moreover, as viewed from the front, the optical filter 25 has a shape similar to the shape of a wall section 23A forming a space between the projection opening 231 and the exhaust port 233 of the front case 23.

In addition, as viewed from the front, the exterior housing 2 is formed so that the right and left parts thereof are nearly symmetrical about the projection opening 231.

The control section includes a CPU (central processing unit), ROM (read only memory), RAM (random access memory), and the like, functions as a computer, and controls the operation of the projector 1. The projector 1 of the embodiment is provided in a device main body and is configured so as to be able to perform various kinds of operations by an unillustrated operation panel and perform remote control by a remote control.

Under control of the control section, the optical unit 3 optically processes the luminous flux emitted from the light source 311 and projects the luminous flux.

As shown in FIG. 2, the optical unit 3 includes the light source device 31, an optical integration illumination system 32, a color separation system 33, a relay system 34, an electrooptic device 35, an optical component housing 37 that disposes these components 31 to 35 in predetermined positions on an optical path, the projection lens 36, and the lens shift mechanism 38.

As shown in FIG. 2, the optical unit 3 is formed in roughly the shape of the letter L in a plan view. At one end of the optical unit 3, the light source device 31 is detachably disposed, and, at the other end, the projection lens 36 is disposed.

The light source device 31 includes a discharge light source 311 formed of an ultra-high pressure mercury lamp, a metal halide lamp, or the like, a reflector 312, a parallelizing lens 313 as a light transmissive component, and the like. After reflecting luminous fluxes emitted from the light source 311 with the reflector 312, the light source device 31 uses the parallelizing lens 313 to make the luminous fluxes travel in one direction, and makes the luminous fluxes travel to the optical integration illumination system 32.

The optical integration illumination system 32 includes a first lens array 321, a second lens array 322, a polarization conversion element 323, and a superimposing lens 324.

The first lens array 321 is an optical element that divides the luminous flux emitted from the light source device 31 into a plurality of partial luminous fluxes, and includes a plurality of small lenses arranged in a matrix in a plane that is nearly orthogonal to an optical axis C of the luminous flux emitted from the light source device 31.

The second lens array 322 has almost the same configuration as that of the first lens array 321, and, together with the superimposing lens 324, superimposes the partial luminous fluxes exiting from the first lens array 321 on the surface of a liquid crystal light valve 351 which will be described later.

The polarization conversion element 323 has the function of making a random light exiting from the second lens array 322 turn into almost one type of polarized light that can be used in the liquid crystal light valve 351.

The color separation system 33 includes two dichroic mirrors 331 and 332 and a reflection mirror 333, and has the function of separating the luminous flux exiting from the optical integration illumination system 32 into three colored lights: a red light (hereinafter referred to as an "R light"), a green light (hereinafter referred to as a "G light"), and a blue light (hereinafter referred to as a "B light").

The relay system 34 includes a light incident-side lens 341, a relay lens 343, and reflection mirrors 342 and 344, and has the function of guiding the R light separated in the color separation system 33 to a liquid crystal light valve 351R for R light. Incidentally, the optical unit 3 is configured so that the relay system 34 guides the R light. However, the configuration is not limited thereto. For example, the optical unit 3 may be configured so that the relay system 34 guides the B light.

The electrooptic device 35 includes the liquid crystal light valve 351 as a light modulating device and a cross dichroic prism 352 as a color combining optical device, modulates the colored lights separated in the color separation system 33 in accordance with image information for a right eye and a left eye, and combines the modulated colored lights.

The liquid crystal light valve 351 is provided for each of the three colored lights (a liquid crystal light valve for R light is referred to as a liquid crystal light valve 351R, a liquid crystal light valve for G light is referred to as a liquid crystal light valve 351G, and a liquid crystal light valve for B light is referred to as a liquid crystal light valve 351B), and each liquid crystal light valve 351 has a transmissive liquid crystal panel and a light incident-side polarizer and a light exiting-side polarizer which are disposed on both sides of the transmissive liquid crystal panel.

The liquid crystal light valve 351 has a rectangular pixel region in which unillustrated minute pixels are formed in a matrix, and the pixels are each set at light transmittance in accordance with image information and form a display image in the pixel region. The colored lights separated in the color separation system 33 are each modulated in the liquid crystal light valve 351 and are then made to travel to the cross dichroic prism 352.

The cross dichroic prism 352 is formed of four right-angle prisms bonded together and has a virtually square shape in a plan view, and, at the interface at which the right-angle prisms are bonded together, two dielectric multilayers are formed. In the cross dichroic prism 352, the dielectric multilayers reflect the colored lights modulated in the liquid crystal light valves 351R and 351B and transmit the colored light modulated in the liquid crystal light valve 351G, thereby combining the colored lights. Then, the light obtained by combining in the cross dichroic prism 352 is made to travel to the projection lens 36 while maintaining the optical axis 35C.

The projection lens 36 includes a plurality of lenses (not shown), the zoom lever 361, and the focus lever 362 (which are shown in FIG. 1), and is attached to the lens shift mechanism 38. The projection lens 36 enlarges the light which is obtained by combining in the cross dichroic prism 352 after being modulated in the liquid crystal light valve 351 and projects the light onto the screen. As a result, an image for a left eye and an image for a right eye are projected alternately onto the screen on a frame-by-frame basis.

Then, zooming of the projection lens 36 is adjusted as a result of the zoom lever 361 being rotated and thereby moving the lens contributing to the zoom adjustment, and the focus of the projection lens 36 is adjusted as a result of the focus lever 362 being rotated and thereby moving the lens contributing to the focus adjustment.

The lens shift mechanism 38 movably supports the projection lens 36, and is attached to the optical component housing 37. The lens shift mechanism 38 includes the first dial 381 and the second dial 382 as operation sections (see FIG. 1), and moves the projection lens 36 in two directions (±X direction and ±Z direction) intersecting at right angles in a plane orthogonal to the optical axis 35C as a result of the first dial 381 and the second dial 382 being operated by a user.

As shown in FIG. 2, the transmitter 4 is disposed next to the projection lens 36 on the +X side of the projection lens 36. The transmitter 4 includes a circuit substrate and a plurality of light emitting sections (of which none is illustrated), and is connected to the control section via an unillustrated cable. In the transmitter 4, based on an instruction from the control section, the plurality of light emitting sections output, to the screen, a light signal synchronized with switching between an image for a right eye and an image for a left eye. As the light emitting section of the embodiment, an LED (light emitting diode) that outputs an infrared light is adopted. Incidentally, the light emitting section is not limited to an LED that outputs an infrared light, and may be an optical element that outputs a light signal in other wavelength regions.

As described earlier, the light signal output from the transmitter 4 passes through the optical filter 25 (see FIGS. 1 and 2) and is made to exit to the outside of the projector 1. Then, the light signal which is made to exit to the outside of the projector 1 is reflected by the screen, and arrives at the viewer who is viewing the projected image. By wearing the glasses for viewing images, the viewer can recognize the image projected on the screen as a stereoscopic image.

Though not described in detail, the glasses for viewing images include a liquid crystal shutter for a right eye, a liquid crystal shutter for a left eye, a receiving section that receives the light signal, and a driving section that drives the liquid crystal shutters. In the glasses for viewing images, the right and left liquid crystal shutters are alternately opened and closed as a result of the driving section being driven in response to the received light signal. The viewer who wears the glasses for viewing images views the image for a left eye projected on the screen only with the left eye and the image for a right eye only with the right eye, thereby recognizing the images as stereoscopic images.

As shown in FIG. 2, the cover guiding section 5 is disposed inside the front case 23 near the projection lens 36, and movably guides the lens cover 6. The cover guiding section 5 will be described in detail later.

The lens cover 6 has a first cover 61 and a second cover 62, and opens and closes the projection opening 231 as a result of the first cover 61 and the second cover 62 being slid by the drive power from the driving section 7. The lens cover 6 includes an open state in which the projection opening 231 is opened and a closed state in which the projection opening 231 is closed by the slide movement of the first cover 61 and the second cover 62, and is configured in such a way that the open state is smaller than the closed state when viewed from the side where light exits from the projection lens 36.

As shown in FIG. 2, the driving section 7 is disposed on the −X side of the projection lens 36, that is, on the opposite side of the transmitter 4 with respect to the projection lens 36. The driving section 7 has a motor 71, a plurality of gears, and the like (see FIG. 3), and is configured so as to slide the first cover 61 and the second cover 62 by electric power based on an instruction from the control section. The cover guiding section 5, the lens cover 6, and the driving section 7 will be described in detail later.

The detecting section 8 includes a first detection switch 81 and a second detection switch 82 and, as shown in FIG. 2, is disposed on the cover guiding section 5.

The first detection switch 81 and the second detection switch 82 (see FIG. 3) are formed so as to have the same configuration, each have two lead pieces, and are connected to the control section via cables (not shown). In a normal state, the first detection switch 81 and the second detection switch 82 are in an off state in which the two lead pieces are away from each other, and, when the two lead pieces make contact with each other as a result of one lead piece being pressed, the first detection switch 81 and the second detection switch 82 are brought to an on state.

The first detection switch 81 and the second detection switch 82 are switched between an on state and an off state by the first cover 61, and detect the open state and the closed state of the lens cover 6. Incidentally, the operation of the detecting section 8 will be described in detail later.

Configuration of the Cover Guiding Section

Here, the cover guiding section 5 will be described in detail.

Figure 3:
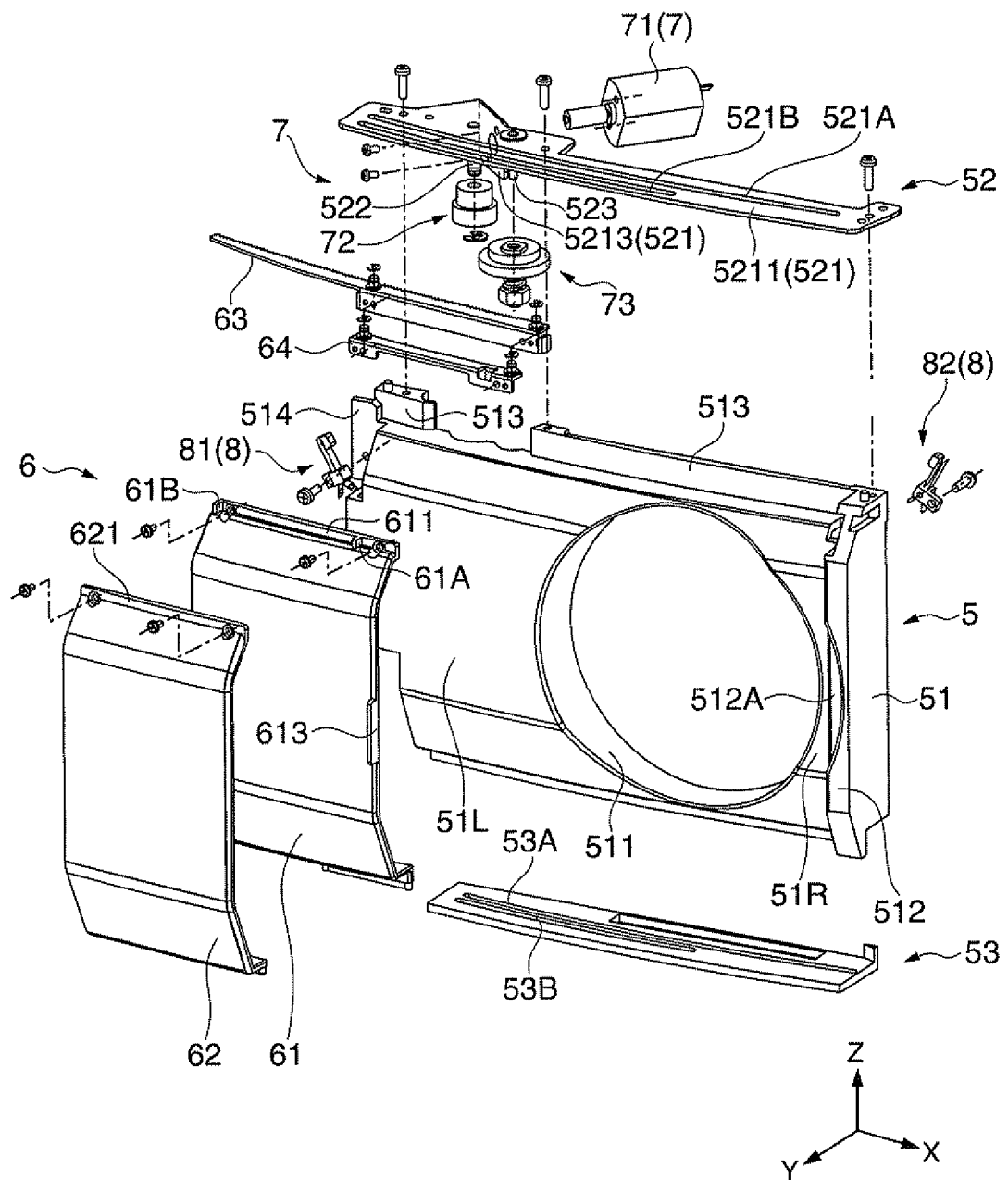
FIG. 3 is an exploded perspective view of a cover guiding section, a lens cover, and a driving section of the embodiment.
Figure 4A:
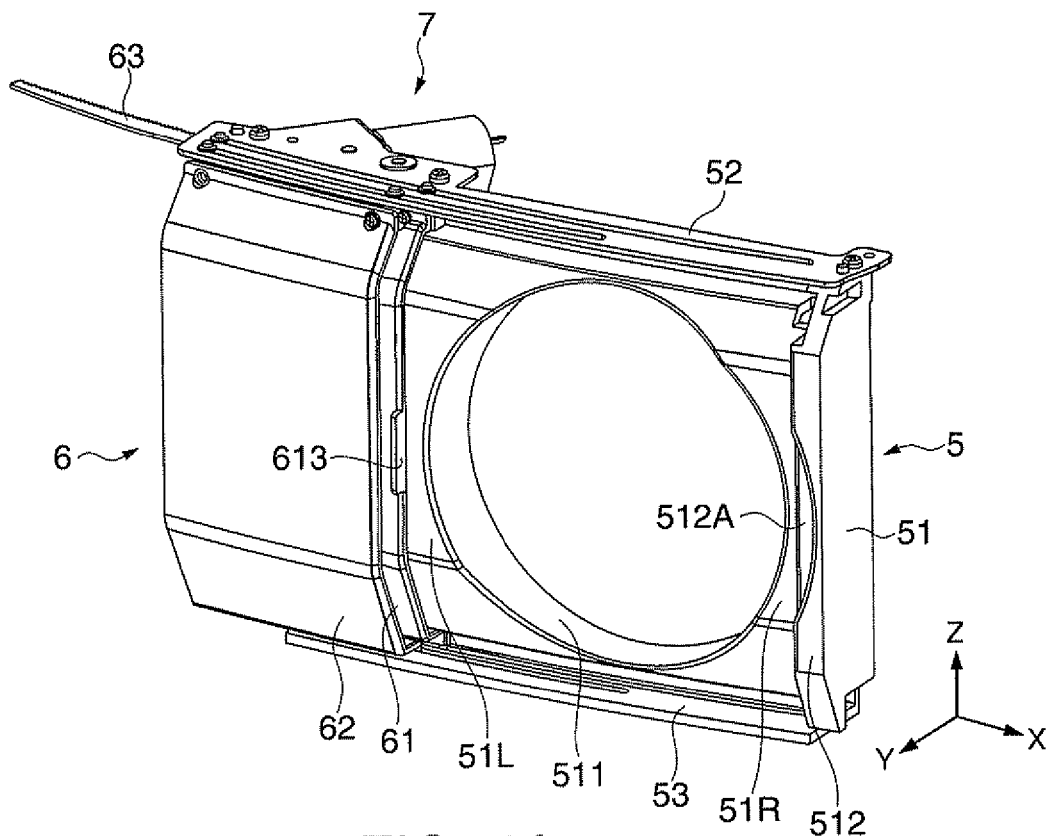
FIGS. 4A and 4B are perspective views of the cover guiding section, the lens cover, and the driving section of the embodiment in an open state.
Figure 4B:
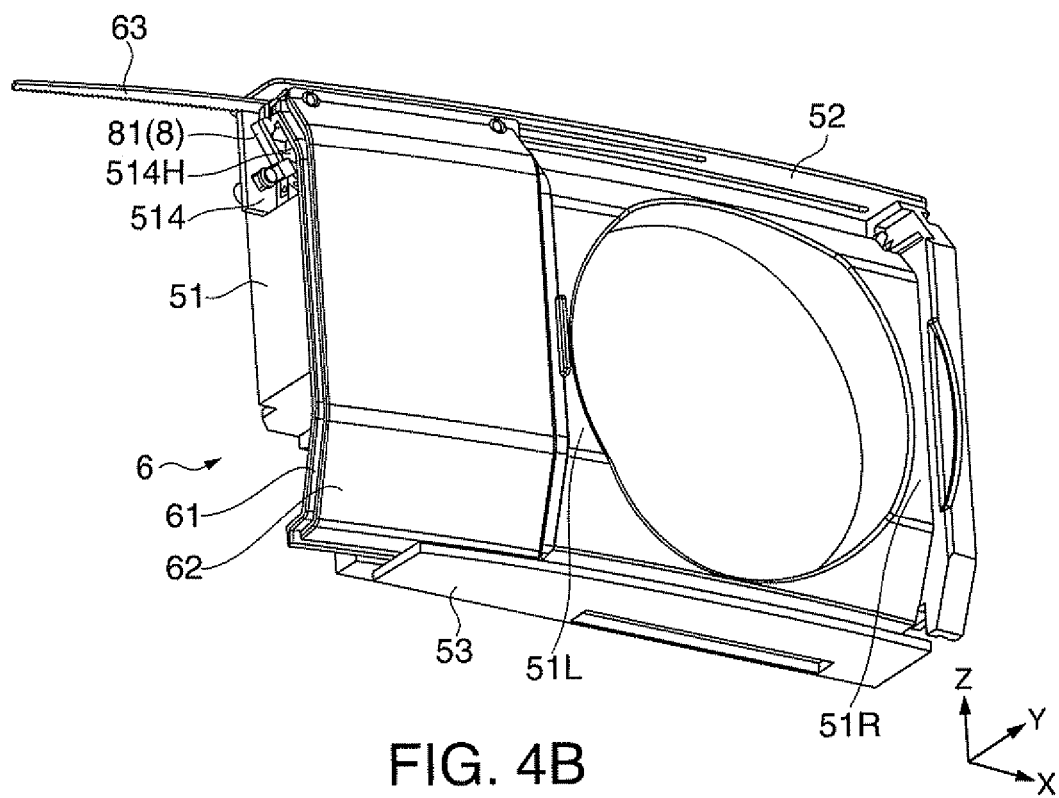
Figure 5:
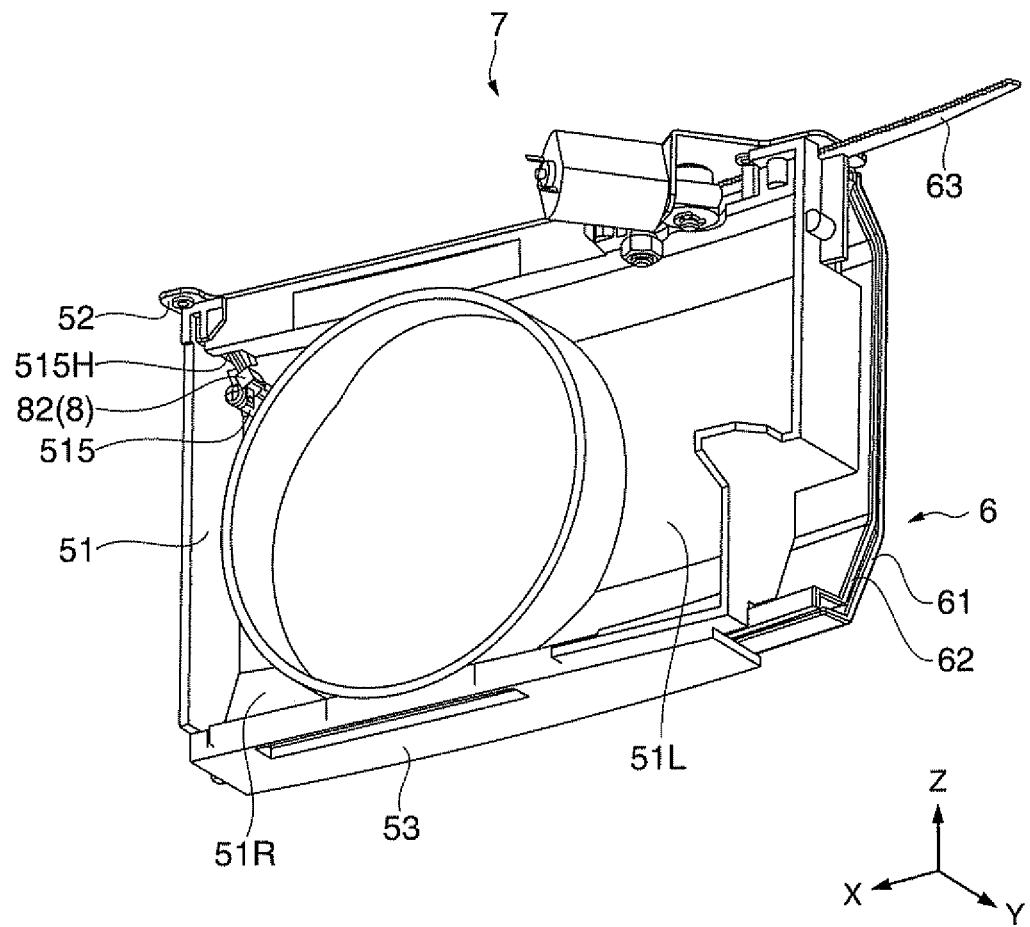
FIG. 5 is a perspective view of the cover guiding section, the lens cover, and the driving section of the embodiment in an open state.

FIG. 3 is an exploded perspective view of the cover guiding section 5, the lens cover 6, and the driving section 7. FIGS. 4A and 4B and FIG. 5 are perspective views of the cover guiding section 5, the lens cover 6, and the driving section 7 in an open state, FIGS. 4A and 4B are perspective views of the cover guiding section 5, the lens cover 6, and the driving section 7 as viewed diagonally from the front, and FIG. 5 is a perspective view of the cover guiding section 5, the lens cover 6, and the driving section 7 as viewed diagonally from the back.

As shown in FIG. 3, the cover guiding section 5 includes a guide main body section 51, an upper guiding section 52, and a lower guiding section 53.

The guide main body section 51 has a shape similar to the shape of an area near the projection opening 231 of the front case 23 (see FIG. 1), and has formed therein an opening 511 through which the light that is made to exit from the projection lens 36 passes. In the guide main body section 51, a part (a left-side forming section 51L) on the −X side of the opening 511 is formed so as to be larger than a part (a right-side forming section 51R) on the +X side of the opening 511. As shown in FIGS. 4A and 4B, the first cover 61 and the second cover 62 are stacked and housed in the left-side forming section 51L in an open state.

As shown in FIG. 3, a front face (a face on the +Y side) of the right-side forming section 51R is formed so that an outer edge of the opening 511 follows a front face of the left-side forming section 51L, and the end on the +X side protrudes in the shape of a rectangle in a plan view. In the center of a protrusion 512 protruding in the shape of a rectangle in a plan view, a concave portion 512A that is a recess in the front face and a side face on the −X side is formed.

At an upper edge of the left-side forming section 51L and the right-side forming section 51R, a projection 513 that projects almost along the X-Z plane and connects to the protrusion 512 is provided. The projection 513 has a shape obtained by cutting off part of an area near the −X-side end, and, in a space generated by this cutting, part of the driving section 7 is disposed. In top faces of the projection 513 and the protrusion 512, a plurality of positioning pins and screw holes by which the upper guiding section 52 is positioned and fixed are provided.

As shown in FIG. 3, the left-side forming section 51L has a concave portion 514 formed as a result of an upper end on the −X side being recessed backward, and, on the +X side of the concave portion 514, a hole 514H (see FIG. 4B) is formed. As shown in FIG. 4B, the first detection switch 81 is screwed to the concave portion 514 so that the two lead pieces are located in front of the concave portion 514 and the unillustrated cable is located behind the left-side forming section 51L.

As shown in FIG. 5, in a back face of the right-side forming section 51R, a boss 515 having a screw hole near the upper end on the +X side is provided, and, above the boss 515, a hole 515H is provided. The second detection switch 82 is screwed to the boss 515 in such a way that the two lead pieces are placed through the hole 515H and are exposed forward.

As shown in FIG. 3 and FIGS. 4A and 4B, the upper guiding section 52 is disposed on an upper side of the guide main body section 51 and is configured so that the upper guiding section 52 slidably supports an upper edge of the lens cover 6.

Figure 6A:
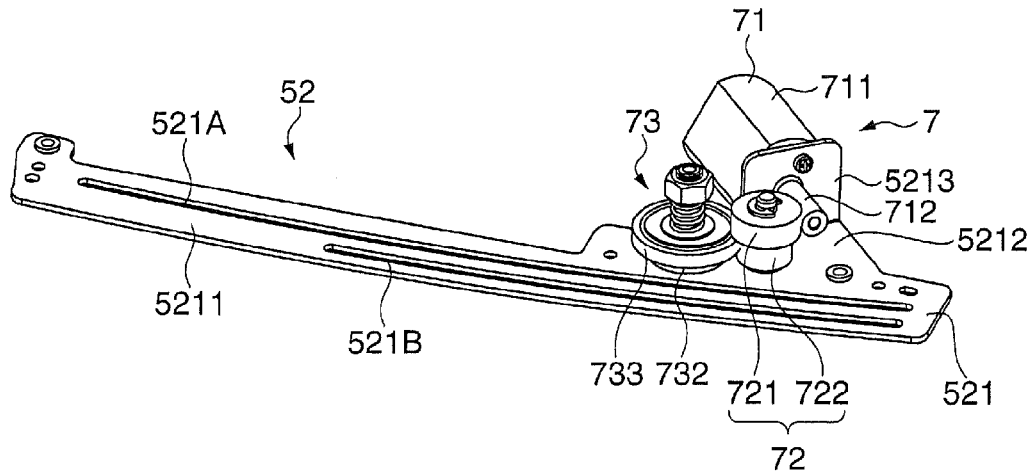
FIGS. 6A and 6B are perspective views showing an upper guiding section and the driving section of the embodiment.
Figure 6B:
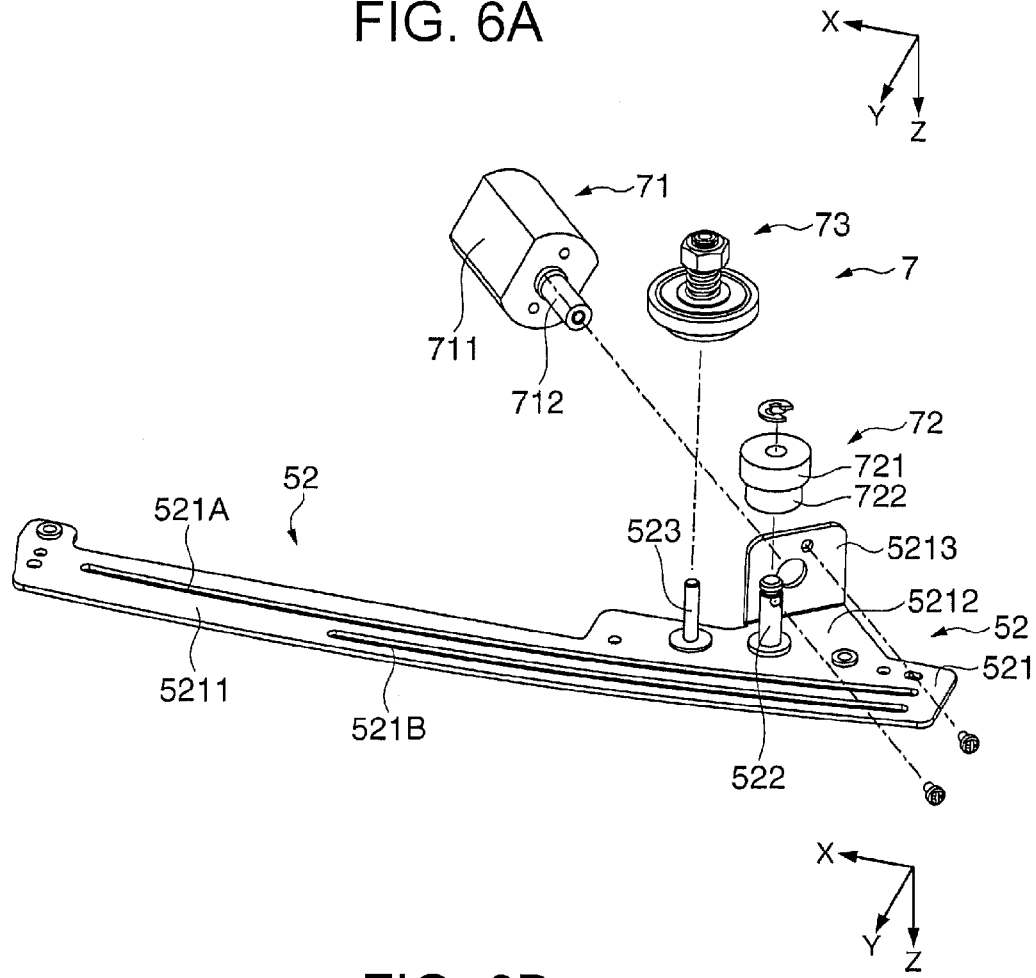
Figure 7:
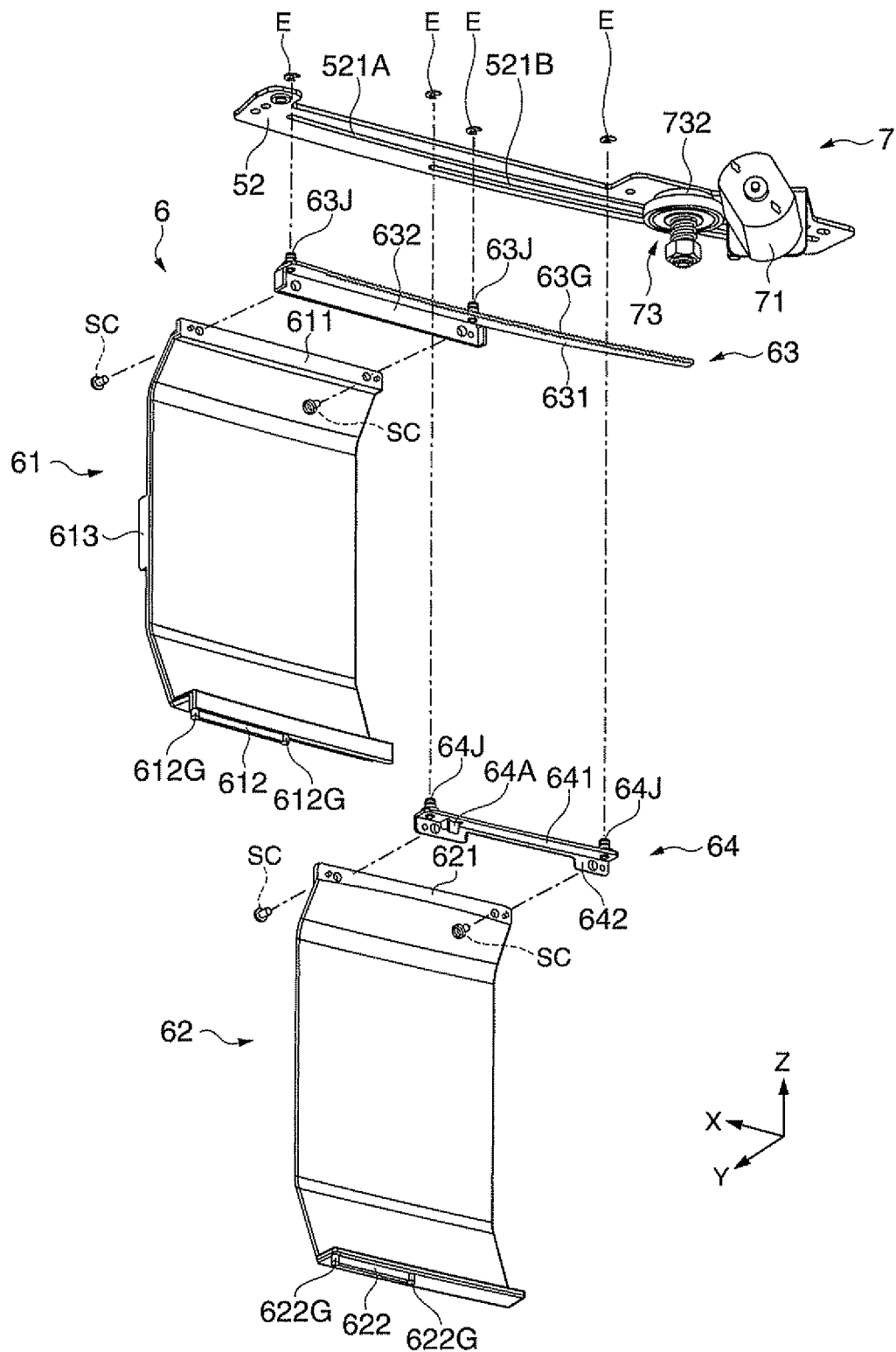
FIG. 7 is an exploded perspective view of the upper guiding section, the lens cover, and the driving section of the embodiment.

FIGS. 6A and 6B are perspective views showing the upper guiding section 52 and the driving section 7, FIG. 6A is a diagram of the upper guiding section 52 and the driving section 7 as viewed diagonally from the below, and FIG. 6B is an exploded view of the upper guiding section 52 and the driving section 7. FIG. 7 is an exploded perspective view of the upper guiding section 52, the lens cover 6, and the driving section 7.

As shown in FIGS. 6A and 6B, the upper guiding section 52 has a base section 521 and a first shaft 522 and a second shaft 523 which are attached to the base section 521.

The base section 521 is made of sheet metal and, as shown in FIGS. 6A and 6B, has a long rail forming section 5211 which extends along the X-Y plane following the top face of the projection 513 (see FIG. 3), a shaft mounting section 5212 jutting backward on the −X side (to the −Y side) of the rail forming section 5211, and a motor attaching section 5213 that is bent in the −Z direction from the back end of the shaft mounting section 5212. Incidentally, as the base section 521, a material on which blackening treatment has been performed to suppress reflection of light is adopted.

In the rail forming section 5211, as shown in FIGS. 6A and 6B, two long holes (a first upper rail 521A and a second upper rail 521B) formed in a direction in which the rail forming section 5211 extends are provided.

The first upper rail 521A guides an upper side of the first cover 61 via a first fixing plate 63 (see FIG. 7) which will be described later. The first upper rail 521A is formed from the neighborhood of the −X-side end of the rail forming section 5211 to the neighborhood of the +X-side end of the rail forming section 5211, and is formed so that guide shafts 63J (see FIG. 7) attached to the first fixing plate 63 are placed therethrough and the first cover 61 is smoothly slid.

The second upper rail 521B guides an upper side of the second cover 62 via a second fixing plate 64 (see FIG. 7) which will be described later. As shown in FIGS. 6A and 6B, the second upper rail 521B is formed on the +Y side of the first upper rail 521A, is provided next to the first upper rail 521A from a position lying almost along the −X side of the first upper rail 521A, and is formed so as to be shorter than the first upper rail 521A. The second upper rail 521B is formed so that guide shafts 64J (see FIG. 7), which will be described later, are placed therethrough and the second cover 62 is smoothly slid.

In the shaft mounting section 5212, as shown in FIGS. 6A and 6B, the first shaft 522 and the second shaft 523 jut in the −Z direction and are fixed with a predetermined distance kept between them.

The motor attaching section 5213 is formed in such a way that a predetermined distance is kept between the motor attaching section 5213 and the first and second shafts 522 and 523, and has formed therein a hole and a screw hole with which the motor 71, which will be described later, of the driving section 7 is attached.

Moreover, at the +X-side end of the rail forming section 5211 and in the shaft mounting section 5212, a plurality of holes are formed. The plurality of holes are formed in positions corresponding to the positioning pins and the screw holes provided on the top faces of the protrusions 512 and 513 (see FIG. 3) of the cover guiding section 5, and the upper guiding section 52 is positioned at the protrusions 512 and 513 and is screwed thereto.

As shown in FIG. 3 and FIGS. 4A and 4B, the lower guiding section 53 is disposed on the underside of the guide main body section 51 and is configured so that the lower guiding section 53 slidably supports a lower end of the lens cover 6.

The lower guiding section 53 is made of synthetic resin and, as shown in FIG. 3, is formed in the shape of a long object that extends along a lower end of the guide main body section 51.

In the lower guiding section 53, as shown in FIG. 3, a first lower rail 53A and a second lower rail 53B which correspond to the first upper rail 521A and the second upper rail 521B, respectively, of the upper guiding section 52 are provided.

The first lower rail 53A is a groove that guides a lower side of the first cover 61. As shown in FIG. 3, the first lower rail 53A is formed from the neighborhood of the −X-side end of the lower guiding section 53 to the neighborhood of the +X-side end of the lower guiding section 53, and is formed so that guide sections 612G (see FIG. 7), which will be described later, of the first cover 61 are placed therethrough and the first cover 61 is smoothly slid.

The second lower rail 53B is a groove that guides a lower side of the second cover 62. As shown in FIG. 3, the second lower rail 53B is formed on the +Y side of the first lower rail 53A, is provided next to the first lower rail 53A from a position lying almost along the −X side of the first lower rail 53A, and is formed so as to be shorter than the first lower rail 53A. The second lower rail 53B is formed so that guide sections 622G (see FIG. 7), which will be described later, are placed therethrough and the second cover 62 is smoothly slid. The lower guiding section 53 is screwed to a lower part of the guide main body section 51.

Configuration of the Lens Cover

Next, the lens cover 6 will be described in detail.

As shown in FIGS. 3 and 7, in addition to the first cover 61 and the second cover 62, the lens cover 6 includes the first fixing plate 63 and the second fixing plate 64. The lens cover 6 is slid by being guided by the cover guiding section 5 as a result of the lens cover 6 being driven by the driving section 7, and thereby opens and closes the projection opening 231.

The first cover 61 and the second cover 62 are made of synthetic resin and, as shown in FIG. 3 and FIGS. 4A and 4B, are configured in such a way that the first cover 61 and the second cover 62 are stacked in this order on the front side of the cover guiding section 5 and move inside the front case 23 to open or close the projection opening 231.

The first cover 61 has a shape following the front face of the left-side forming section 51L in a vertical direction, and is formed so as to have a smaller dimension than the left-side forming section 51L in an X direction.

As shown in FIG. 7, an upper end 611 of the first cover 61 is formed so as to lie almost along the X-Z plane, and, near the right and left ends of the upper end 611, positioning pins jutting backward and circular holes piercing through the upper end 611 in a Y direction are provided.

As shown in FIG. 7, the lower end of the first cover 61 is formed so as to lie almost along the X-Z plane, and a +X-side part of the lower end (a projection 612) juts downward as compared to the −X-side part. In addition, at the right and left ends of the projection 612, as shown in FIGS. 3 and 7, the guide sections 612G having convex curved surfaces on the front and back sides thereof are provided. As described earlier, the guide sections 612G are inserted into the first lower rail 53A (see FIG. 3) of the lower guiding section 53, allowing the first cover 61 to be slid smoothly.

In the first cover 61, as shown in FIG. 3, pulling sections 61A and 61B jutting from the front face of the upper end 611 are formed.

The pulling section 61A is formed near the +X-side end of the upper end 611, and has the function of pulling the second cover 62 when the first cover 61 is moved from a closed state to an open state. The pulling section 61B is formed near the −X-side end of the upper end 611, and has the function of pulling the second cover 62 when the first cover 61 is moved from an open state to a closed state.

Moreover, in the center of the +X-side end of the first cover 61, as shown in FIG. 3, a gripper 613 jutting forward is formed. The gripper 613 is located near the concave portion 512A in a closed state and is formed so as to jut forward as compared to the concave portion 512A. Moreover, the gripper 613 is formed so as to be exposed from the projection opening 231 in an open state (see FIG. 1) and a closed state.

The lens cover 6 of the embodiment is configured so that it can be slid not only by the driving section 7 by electric power but also by hand. The gripper 613 is formed so that the user of the projector 1 can easily slide the lens cover 6 by hand.

As shown in FIG. 7, the second cover 62 has a shape following the front face of the first cover 61, and is formed so that the dimension in the X direction is equal to that of the first cover 61. The second cover 62 has an upper end 621 which is formed in the same manner as the upper end 611 of the first cover 61 and a projection 622 which is formed in the same manner as the projection 612 of the first cover 61.

In addition, in the projection 622, the guide sections 622G which are formed in the same manner as the guide sections 612G of the first cover 61 are provided. The guide sections 622G are inserted into the second lower rail 53B (see FIG. 3) of the lower guiding section 53, allowing the second cover 62 to be slid smoothly. Incidentally, as the first cover 61 and the second cover 62 of the embodiment, a translucent material is adopted to add luxury to the design.

The first fixing plate 63 is a member to which the drive power of the driving section 7 is transferred. The first cover 61 is attached to the first fixing plate 63, and the first fixing plate 63 is slid with the first cover 61. The first fixing plate 63 is made of sheet metal, and, as shown in FIG. 7, has a tooth profile forming section 631 lying along the X-Y plane and an attachment section 632 which is bent downward with respect to the tooth profile forming section 631 and lies along the X-Z plane.

As shown in FIG. 7, the tooth profile forming section 631 is formed in the shape of a long object which is long in a direction in which the first cover 61 is slid, and, in an end face on the −Y side thereof, a tooth profile 63G on which a slip gear 732, which will be described later, of the driving section 7 is threadably mounted is formed.

In the center of the tooth profile forming section 631 and near the +X-side end of the tooth profile forming section 631, the guide shafts 63J jutting upward are attached. As described earlier, the guide shafts 63J are inserted into the first upper rail 521A of the upper guiding section 52, allowing the first cover 61 to be slid smoothly.

The attachment section 632 is formed by being bent from the +Y side of the tooth profile forming section 631, and is provided between nearly the center and the +X-side end of the tooth profile forming section 631 in the X direction. In the attachment section 632, holes and screw holes corresponding to the positioning pins and the circular holes provided in the upper end 611 of the first cover 61 are formed.

As shown in FIG. 7, the guide shafts 63J are inserted into the first upper rail 521A of the upper guiding section 52 and snap rings E are attached near the tips of the guide shafts 63J, whereby the first fixing plate 63 is supported on the upper guiding section 52.

The first cover 61 is screwed to the first fixing plate 63 supported on the upper guiding section 52. When the first cover 61 is attached to the first fixing plate 63, the first fixing plate 63 is brought into a state in which the −X side of the tooth profile forming section 631 sticks out from the first cover 61.

The second cover 62 is attached to the second fixing plate 64, and the second fixing plate 64 moves with the second cover 62. The second fixing plate 64 is made of sheet metal and, as shown in FIG. 7, has a guide shaft attaching section 641 lying along the X-Y plane and an attachment section 642 which is bent downward with respect to the guide shaft attaching section 641 and lies along the X-Z plane.

Near the right and left ends of the guide shaft attaching section 641, the guide shafts 64J jutting upward are attached. As described earlier, the guide shafts 64J are inserted into the second upper rail 521E of the upper guiding section 52, allowing the second cover 62 to be slid smoothly.

Moreover, in the guide shaft attaching section 641, an engagement section 64A jutting downward is formed by cutting and bending. The engagement section 64A is formed so as to be located between the pulling section 61A and the pulling section 61B of the first cover 61, and engages the pulling section 61A or the pulling section 61B depending on the direction in which the first cover 61 is moved.

The attachment section 642 is formed by being bent from the +Y side of the guide shaft attaching section 641, and has formed therein holes and screw holes corresponding to the positioning pins and circular holes provided in the upper end 621 of the second cover 62.

As shown in FIG. 7, the guide shafts 64J are inserted into the second upper rail 521B of the upper guiding section 52 and the snap rings E are attached near the tips of the guide shaft 64J, whereby the second fixing plate 64 is supported on the upper guiding section 52.

The second cover 62 is screwed to the second fixing plate 64 supported on the upper guiding section 52.

Configuration of the Driving Section

The driving section 7 is disposed near an upper edge of the first cover 61 in a closed state, and is configured so as to be able to slide the first cover 61 and the second cover 62 by electric power.

As shown in FIGS. 6A and 6B, the driving section 7 includes the motor 71 as an output section that outputs the drive power, a reduction gear 72, and a transferring section 73, and is attached to the upper guiding section 52.

The motor 71 includes a motor main body 711 having a spindle (not shown) which is a rotating shaft and a pinion 712 provided at the tip of the spindle. As shown in FIGS. 6A and 6B, the motor 71 is screwed to the motor attaching section 5213 in such a way that the pinion 712 is located on the −Z side of the shaft mounting section 5212. In addition, the motor 71 is connected to the control section via an unillustrated cable.

The reduction gear 72 engages the pinion 712 and transfers the drive power output from the motor 71 to the transferring section 73. Specifically, the reduction gear 72 is made of synthetic resin and, as shown in FIGS. 6A and 6B, has a main gear 721 and a pinion 722 which are coaxially stacked. The diameter of the main gear 721 is set so as to be greater than the diameter of the pinion 722.

The reduction gear 72 is rotatably supported on the first shaft 522 as a result of the main gear 721 engaging the pinion 712. Then, the reduction gear 72 reduces the speed of the rotation of the pinion 712 and transfers the rotation to the transferring section 73.

The transferring section 73 engages the pinion 722 and transfers the drive power of the motor 71 which has been transferred thereto via the reduction gear 72 to the lens cover 6, specifically, to the first fixing plate 63. Moreover, the transferring section 73 has a sliding mechanism by which sliding is generated when torque which is higher than predetermined torque is applied by the force from the first fixing plate 63.

Figure 8A:
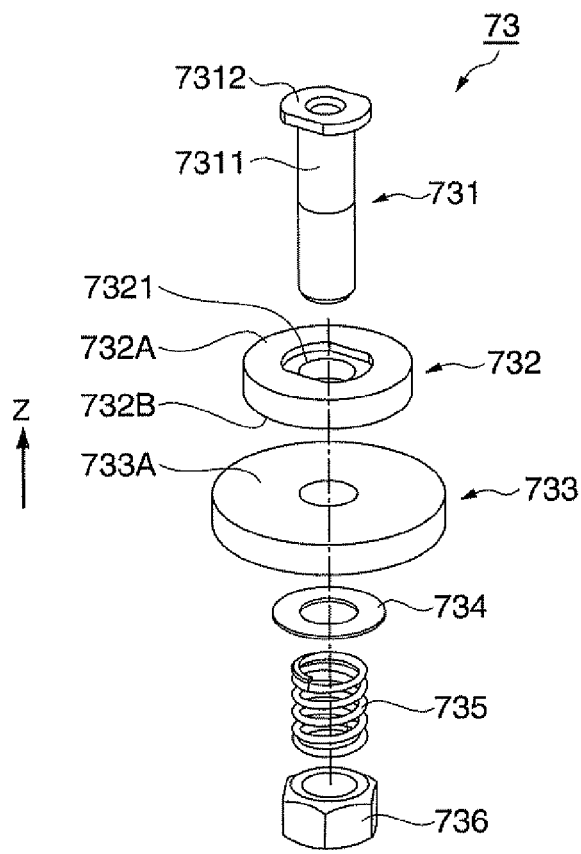
FIG. 8A is an exploded perspective view of a transferring section of the embodiment.
Figure 8B:
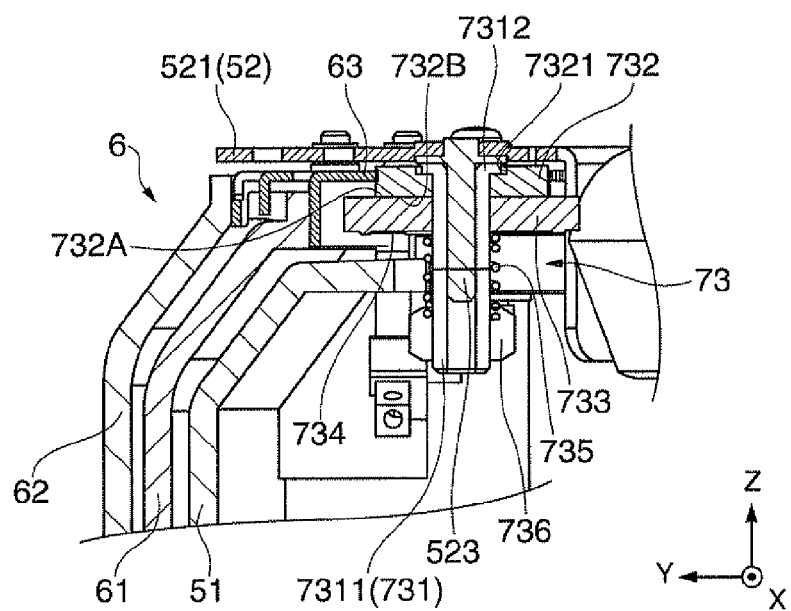
FIG. 8B is a sectional view showing the transferring section of the embodiment and the upper guiding section and the lens cover near the transferring section.

FIG. 8A is an exploded perspective view of the transferring section 73, and FIG. 8B is a sectional view showing the transferring section 73 and the upper guiding section 52 and the lens cover 6 near the transferring section 73.

As shown in FIG. 8A, the transferring section 73 includes a shaft 731, a slip gear 732 as a cover-side transferring section, an intermediate gear 733 as an output-side transferring section, a washer 734, a coil spring 735, and a nut 736.

The shaft 731 has a cylindrical shaft section 7311 and a flange section 7312 jutting in a radial direction with respect to the shaft section 7311, and, as shown in FIG. 8B, at the center of the shaft 731, a center hole into which the second shaft 523 is inserted is formed. The shaft 731 is rotatably supported on the second shaft 523.

As shown in FIG. 8A, the flange section 7312 is formed at one end of the shaft section 7311 and is formed so as to have a flat portion in part of the outer edge thereof. Moreover, at an end of the shaft section 7311 opposite from the flange section 7312, a thread groove (not shown) in which the nut 736 engages is formed.

The slip gear 732 engages the tooth profile 63G of the first fixing plate 63. As shown in FIG. 8A, the slip gear 732 has, at the center thereof, a center hole into which the shaft section 7311 of the shaft 731 is inserted and has, in one face 732A thereof, a concave portion 7321 which engages the flange section 7312 of the shaft 731. As shown in FIG. 8B, the shaft section 7311 is inserted into the center hole and the flange section 7312 engages the concave portion 7321, whereby the slip gear 732 is rotatably supported on the second shaft 523 along with the shaft 731.

As shown in FIG. 6A, the intermediate gear 733 engages the pinion 722 of the reduction gear 72. That is, the intermediate gear 733 engages the motor 71 via the reduction gear 72. As shown in FIGS. 8A and 8B, the diameter of the intermediate gear 733 is set so as to be greater than the diameter of the slip gear 732, and, at the center of intermediate gear 733, a center hole into which the shaft section 7311 of the shaft 731 is inserted is formed. As shown in FIG. 8B, in the intermediate gear 733, the shaft section 7311 sticking out from the slip gear 732 is inserted into the center hole. In addition, the intermediate gear 733 is disposed in such a way as to be contact with a face (a contact face 732B) on the side opposite to the face 732A of the slip gear 732.

The washer 734 is formed so as to receive a biasing force of the coil spring 735. The washer 734 has a hole into which the shaft section 7311 is inserted, and, as shown in FIG. 8B, the shaft section 7311 sticking out from the intermediate gear 733 is inserted into the hole.

As shown in FIG. 8B, the shaft section 7311 sticking out from the washer 734 is inserted into the coil spring 735.

The nut 736 sandwiches the coil spring 735 with the washer 734 by being threadably mounted on the thread groove of the shaft section 7311, and the amount by which the nut 736 is threadably mounted on the thread groove is adjusted so that the coil spring 735 biases the intermediate gear 733 by a predetermined force. In addition, the coil spring 735 biases the intermediate gear 733 so that a contact face 733A of the intermediate gear 733 and the contact face 732B of the slip gear 732 have predetermined frictional resistance.

When the motor 71 is driven, the transferring section 73 transfers the force which has been transferred thereto via the reduction gear 72 to the first fixing plate 63. On the other hand, in the transferring section 73, in a state in which the motor 71 is stopped, since the rotation of the intermediate gear 733 is regulated by the holding torque of the motor 71, when torque which is higher than predetermined torque is applied to the slip gear 732, the slip gear 732 resists the biasing force of the coil spring 735, and sliding is generated in the intermediate gear 733. As described above, the transferring section 73 has a sliding mechanism by which sliding is generated between the intermediate gear 733 (the output-side transferring section) and the slip gear 732 (the cover-side transferring section).

Operation of the Lens Cover

Figure 9A:
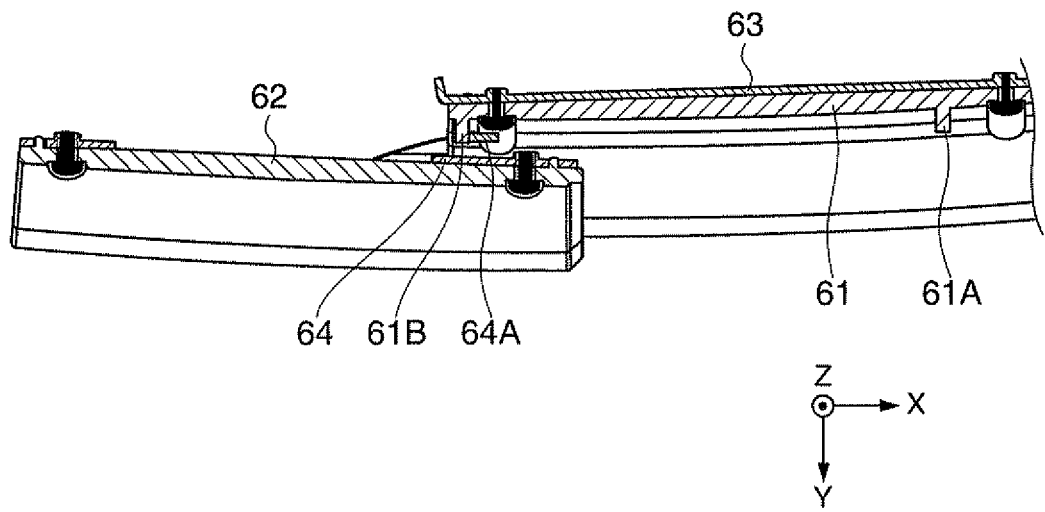
FIGS. 9A and 9B are sectional views of the lens cover, which is viewed from above, of the embodiment.
Figure 9B:
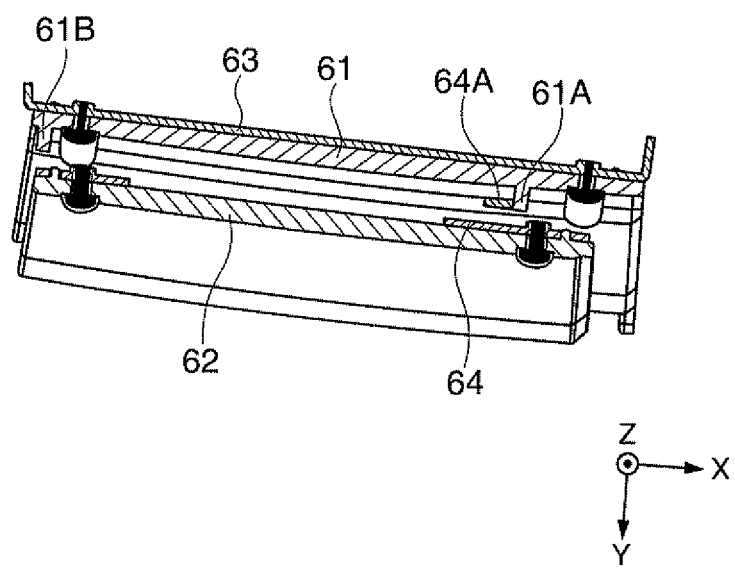
Figure 10:
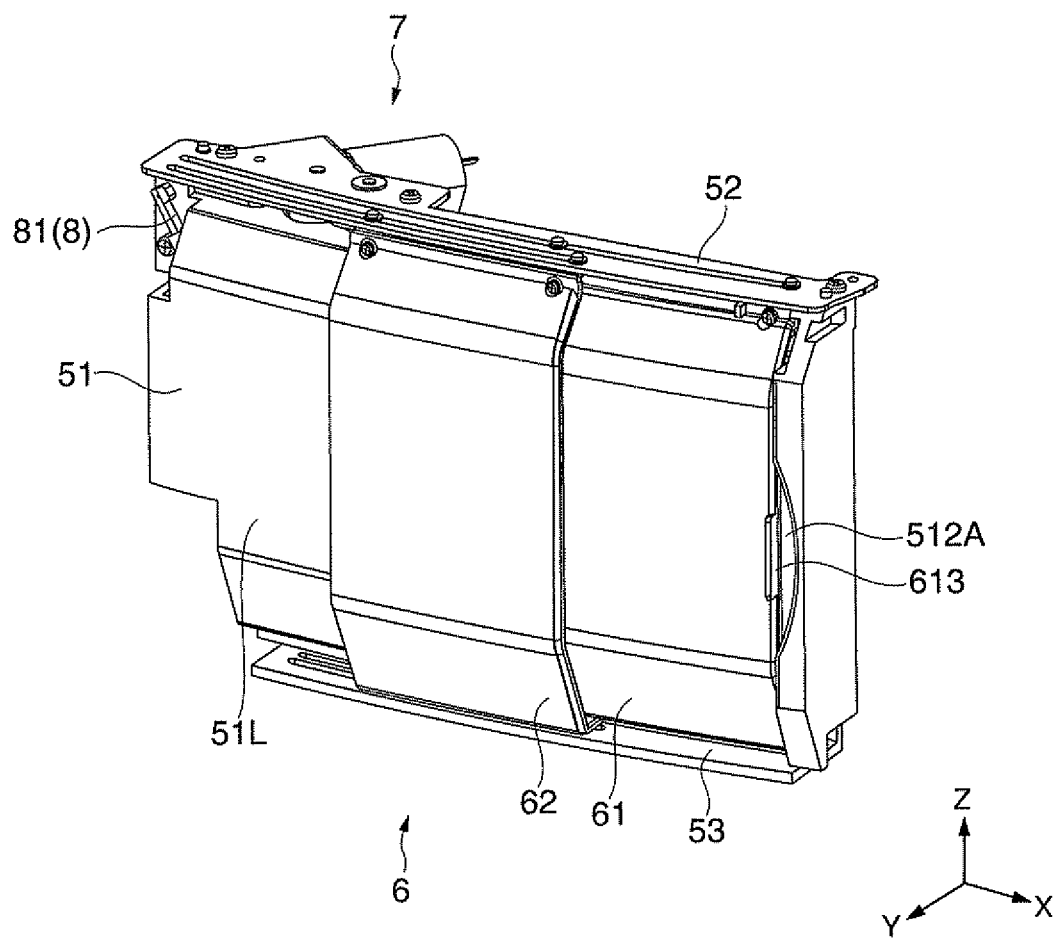
FIG. 10 is a perspective view of the cover guiding section, the lens cover, and the driving section of the embodiment in a closed state.

Here, the operation of the lens cover 6 will be described by using FIGS. 9A and 9B and FIG. 10 in addition to FIGS. 4A and 4B. FIGS. 9A and 9B are sectional views of the lens cover 6 viewed from above, FIG. 9A is a diagram showing the lens cover 6 which is moved from an open state to a closed state, and FIG. 9B is a diagram showing the lens cover 6 which is moved from a closed state to an open state. FIG. 10 is a perspective view of the cover guiding section 5, the lens cover 6, and the driving section 7 in a closed state.

Based on an instruction from the control section by the operation performed by using the operation panel or the remote control, the lens cover 6 is driven by the driving section 7 and opens and closes the projection opening 231.

As shown in FIGS. 4A and 4B, in an open state, the first cover 61 and the second cover 62 are stacked and housed in the left-side forming section 51L, located on the opposite side of the transmitter 4 (see FIG. 2) with the projection lens 36 located between the first and second covers 61 and 62 and the transmitter 4. That is, in an open state, the first cover 61 and the second cover 62 are disposed behind the wall section 23A (see FIG. 1) of the front case 23 between the projection opening 231 and the exhaust port 233. In addition, in an open state, the first cover 61 and the second cover 62 are disposed so as to be stacked in a longitudinal direction at a position where the signal opening 234 (see FIG. 2) is not blocked.

As shown in FIGS. 4A and 4B, in an open state, the first cover 61 is disposed in such a way that the +X-side end thereof is located in a position closer to the +X side than the +X-side end of the second cover 62. In addition, as described earlier, the gripper 613 of the first cover 61 is exposed from the projection opening 231 (see FIG. 1).

As shown in FIG. 4B, in an open state, the first detection switch 81 is brought to an on state as a result of one lead piece being pressed by the −X-side end of the first cover 61 and making contact with the other lead piece. Then, it is detected that the lens cover 6 is in an open state. Moreover, in an open state, the first fixing plate 63 is in a state in which the −X side sticks out from the guide main body section 51.

When the operation panel or the remote control is operated so that an open state is changed to a closed state, in the driving section 7, the motor 71 rotates in a first direction and moves the first fixing plate 63 in a +X direction via the reduction gear 72 and the transferring section 73. The first cover 61 fixed to the first fixing plate 63 moves with the first fixing plate 63 as a result of the guide shafts 63J being guided by the first upper rail 521A and the guide sections 612G being guided by the first lower rail 53A. Then, the first detection switch 81 is switched to an off state as a result of the first cover 61 moving away from the lead piece.

When the first cover 61 is moved from an open state to a predetermined position, as shown in FIG. 9A, the pulling section 61B engages the engagement section 64A and pulls the second fixing plate 64, that is, the second cover 62 fixed to the second fixing plate 64. When the first cover 61 is moved to a position in which the second detection switch 82 is brought to an on state as a result of the two lead pieces thereof being brought into contact with each other, in the driving section 7, the rotation of the motor 71 is stopped. Then, as shown in FIG. 10, the lens cover 6 is brought to a closed state in which the first cover 61 and the second cover 62 close the projection opening 231. In a closed state, the first fixing plate 63 is in a state in which the first fixing plate 63 does not stick out from the guide main body section 51.

On the other hand, when the operation panel or the remote control is operated so that a closed state is changed to an open state, in the driving section 7, the motor 71 rotates in a second direction which is opposite to the first direction and moves the first fixing plate 63 in a −X direction along with the first cover 61 via the reduction gear 72 and the transferring section 73. Then, the second detection switch 82 is switched to an off state as a result of the first cover 61 moving away from the lead piece.

When the first cover 61 is moved from a closed state to a predetermined position, as shown in FIG. 9B, the pulling section 61A engages the engagement section 64A and pulls the second cover 62 along with the second fixing plate 64. When the first cover 61 is moved to a position in which the first detection switch 81 is brought to an on state as a result of the two lead pieces thereof being brought into contact with each other, in the driving section 7, the rotation of the motor 71 is stopped. Then, as shown in FIGS. 4A and 4B, the lens cover 6 is brought to an open state in which the first cover 61 and the second cover 62 are stacked and housed in the left-side forming section 51L and open the projection opening 231.

As described above, the lens cover 6 is slid by being driven by the driving section 7 and opens and closes the projection opening 231. Furthermore, the lens cover 6 is able to open or close the projection opening 231 even in a state in which the projection lens 36 moves by the lens shift mechanism 38. In addition, the lens shift mechanism 38 is configured so that the operation of the first dial 381 and the second dial 382 is possible when the lens cover 6 is either in an open state or a closed state Moreover, as described earlier, the lens cover 6 is configured so that it can be opened and closed by hand. The gripper 613 is gripped and the first cover 61 is moved, whereby the lens cover 6 is opened and closed by hand. Specifically, when the force is applied to the first cover 61, the force is transferred to the slip gear 732 via the first fixing plate 63. When torque exceeding a predetermined force is applied to the slip gear 732, as described earlier, the slip gear 732 slips from the intermediate gear 733, and the first cover 61 is moved.

As described above, when the lens cover 6 is driven by the output of the motor 71, the slip gear 732 is rotated and moved with the intermediate gear 733. When the force is applied to the first cover 61 in a state in which the motor 71 is stopped, the slip gear 732 is moved while slipping from the intermediate gear 733.

As described above, according to the projector 1 of the embodiment, the following effects can be obtained.

(1) The lens cover 6 includes the first cover 61 and the second cover 62 and is configured in such a way that the lens cover 6 in the open state is smaller than that in the closed state when viewed from the side where the light exits from the projection lens 36. As a result, as compared to a configuration in which the projection opening 231 is opened and closed with one cover, it is possible to store the lens cover 6 in an open state in a small space. This makes it possible to provide the projector 1 that can efficiently dispose configurations other than the lens cover 5 (for example, the suction port 232, the exhaust port 233, the suction and exhaust ducts, and the transmitter 4) and can realize miniaturization while making it possible to protect the projection lens 36 when the projector 1 is not used.

(2) The lens cover 6 is configured from a plurality of members (the first cover 61 and the second cover 62) and the first cover 61 is provided with the pulling sections 61A and 61B. As a result, it is possible to move also the second cover 62 by sliding the first cover 61 and open and close the projection opening 231. This makes it possible to simplify the configuration by which the first cover 61 and the second cover 62 are moved and enhance the usability when the projection opening 231 is opened and closed.

(3) The first cover 61 and the second cover 62 are configured so that they are housed on the opposite side of the transmitter 4 with the projection lens 36 located between the first and second covers 61 and 62 and the transmitter 4. As a result, the projector 1 can be configured so as to include the transmitter 4 with a simple structure while preventing a growth in size regardless of the configuration of the lens cover 6.

Moreover, since the transmitter 4 can be located in a position close to the projection lens 36, the duct disposed inside the suction port 232 can be efficiently formed. This makes it possible to realize efficient cooling of the inside of the projector 1 and reduction of noise by driving the fan at low voltage.

(4) The first cover 61 and the second cover 62 are stacked and housed on the opposite side of the transmitter 4 with the projection lens 36 located between the first and second covers 61 and 62 and the transmitter 4. As a result, even when the exterior housing 2 is formed in such a way that the right and left parts thereof are nearly symmetrical about the projection opening 231 when viewed from the front, a growth in size of the exterior housing in a horizontal direction is prevented. This makes it possible to improve the design while preventing a growth in size of the projector 1.

(5) The suction port 232 and the exhaust port 233 are formed on the same side as the side where the luminous flux exits from the projection lens 36. As a result, the projector 1 sucks in air cooling the inside thereof from the projected image side and exhausts the air to the image side. As a result, even in an installation situation in which the member is disposed in the vicinity of the side different from the image side, the projector 1 is able to reliably cool the inside thereof without closing the suction port 232 or the exhaust port 233.

Moreover, in an open state, the lens cover 6 is disposed between the projection opening 231 and the exhaust port 233.

This makes it possible to provide the projector 1 that includes the lens cover 6 capable of being stored with space-saving and improves the degree of freedom of installation.

(6) Since the projector 1 includes the motor-driven driving section 7, the user of the projector 1, even when the projector 1 is hung from a ceiling or the like, can easily move the first cover 61 and the second cover 62 by operating the remote control and thereby open and close the projection opening 231.

(7) Since the driving section 7 includes the transferring section 73 having a sliding mechanism, it is possible to open and close the lens cover 6 by hand without applying a load on the motor 71. This makes it possible to perform maintenance etc. of the projection lens 36 (such as removing dust adhered to the surface of the projection lens 36) by exposing the projection lens 36 by moving the lens cover 6 in a closed state when the projector 1 is not used. Moreover, since the gripper 613 is formed so as to be exposed from the projection opening 231, as compared to a configuration in which the gripper 613 is formed in other areas (for example, a configuration in which the gripper 613 is exposed from the top face of the exterior housing 2), it is possible to improve the design and simplify the production of the projector.

(8) The lens cover 6 is configured so as to move inside the exterior housing 2 to thereby open or close the projection opening 231. As a result, it is possible to improve the design of the projector 1 and prevent the lens cover 6 from erroneously moving due to the contact of the member outside of the projector 1 to the lens cover 6.

(9) The projector 1 is configured so as to be able to project an image for a right eye and an image for a left eye by time division, and to reflect a light signal output from the transmitter 4 by the screen and make the light signal arrive at the viewer who is viewing the image projected onto the screen. Therefore, by wearing the glasses for viewing images, the viewer can easily recognize the image projected onto the screen as a stereoscopic image. This makes it possible to provide the projector 1 that includes the lens cover 6 capable of being stored with space-saving and allows the viewer to recognize the three-dimensional image.

Modified Examples

Incidentally, the embodiment described above may be modified as follows.

The lens cover 6 of the embodiment described above is configured so that the first cover 61 pulls the second cover 62. However, the lens cover 6 may be configured so that the second cover 62 pulls the first cover 61.

The lens cover 6 of the embodiment described above is configured so that the lens cover 6 opens and closes the projection opening 231 by the driving of the driving section 7. However, a configuration may be adopted in which the driving section 7 is not used and the projection opening 231 is opened and closed only by hand.

The lens cover 6 of the embodiment described above is configured so that two members (the first cover 61 and the second cover 62) move to thereby open or close the projection opening 231. However, a configuration may be adopted in which three or more members move to thereby open or close the projection opening 231, and in an open state, these members are stacked. Moreover, even in the configuration in which the three or more members move, a configuration may be adopted in which any one of the members slide so that the other member is pulled.

The lens cover 6 of the embodiment described above is configured so that in an open state, the first cover 61 and the second cover 62 are stacked, but is not limited to this configuration if it is configured so that the lens cover in the open state is smaller than that in the closed state when viewed from the side where light exits from the projection lens 36. For example, a configuration may be adopted in which the lens cover is formed from a plurality of members that are hinge-coupled, and in which a closed state is formed when these members are unfolded and an open state is formed when these members are folded. In addition, a configuration may be adopted in which the lens cover is formed by a member formed in an accordion shape and a closed state and an open state are formed according to the expansion or contraction of this member.

The lens cover may be configured so as to open and close, in addition to the projection opening 231, the openings (for example, the openings 211, 212, 213, and the like shown in FIG. 1) formed on the top face of the upper case.

In the embodiment described above, the transmitter 4 is disposed on the +X side (on the suction port 232 side) of the projection lens 36, and the first cover 61 and the second cover 62 are housed between the projection opening 231 and the exhaust port 233. However, the transmitter 4 may be disposed on the −X side (on the exhaust port 233 side) of the projection lens 36, and the first cover 61 and the second cover 62 may be housed between the projection opening 231 and the suction port 232.

The driving section 7 of the embodiment described above uses the motor 71 as an output section; however, the output section is not limited to the motor 71. For example, the driving section 7 may use a solenoid, for example. In addition, the driving section may be configured so as to include the solenoid and a lever member that moves while increasing the travel distance of the solenoid.

The projector 1 of the embodiment described above is configured so that it can project an image for a right eye as a first image and an image for a left eye as a second image onto the screen by time division. However, the images are not limited to the image for a right eye and the image for a left eye, and the projector 1 may be configured so that it can project a first image and a second image with different contents or the like to be displayed onto the screen by time division. In addition, the glasses for viewing images of the embodiment described are configured so that the right and left liquid crystal shutters are alternately opened and closed; however, the glasses for viewing images may be configured so that the right and left liquid crystal shutters are opened and closed at the same time. This makes it possible to allow each of a plurality of viewers who wear the glasses for viewing images with different shutter switching timing to view the images projected on the screen as a first image and a second image.

The right and left shutters provided in the glasses for viewing images of the embodiment described above are configured by using a liquid crystal panel; however, the right and left shutters are not limited to this configuration. The right and left shutters may be configured as shutters based on other systems.

The lens shift mechanism 38 of the embodiment described above is configured as a hand-operated mechanism. However, the lens shift mechanism 38 may be configured as a motor-driven mechanism provided with a motor and the like.

The projector 1 of the embodiment described above uses a transmissive liquid crystal light valve 351 as a light modulating device. However, the projector 1 may use a reflective liquid crystal light valve.

The light source 311 is not limited to a discharge lamp and may be configured as a lamp of other systems or a solid light source such as a light-emitting diode.

The entire disclosure of Japanese Patent Application No. 2011-056265, filed Mar. 15, 2011 is expressly incorporated by reference herein.

What is claimed is:

1. A projector that modulates a luminous flux emitted from a light source in accordance with image information and projects the modulated light by a projection lens, comprising:
   an exterior housing that houses the projection lens and has a projection opening through which the light exiting from the projection lens passes; and
   a lens cover that opens and closes the projection opening, wherein:
   the lens cover is configured from a plurality of members that includes:
      a first cover that has a first pulling section and a second pulling section;
      a second cover that slides by pulling of the first cover; and
      an engagement section that engages the first pulling section or the second pulling section, but not both at the same time, depending on the direction in which the first cover is moved;
   the lens cover has an open state in which the projection opening is opened and a closed state in which the projection opening is closed, and is configured so that the lens cover in the open state is smaller than that in the closed state when viewed from the side where light exits from the projection lens;
   the first pulling section is configured to engage the engagement section when the lens cover is moved from the closed state to the open state; and
   the second pulling section is configured to engage the engagement section when the lens cover is moved from the open state to the closed state.

2. The projector according to claim 1, wherein the first cover and the second cover are configured so as to be stacked in the open state.

3. The projector according to claim 2, further comprising: a transmitter that outputs a light signal to a screen, wherein the exterior housing has a signal opening through which the light signal passes, and the lens cover in the open state is stacked at a position where the signal opening is not blocked.

4. The projector according to claim 3, wherein in the open state, the lens cover is disposed on the opposite side of the signal opening with the projection opening located between the lens cover and signal opening.

5. The projector according to claim 2, wherein the lens cover is configured so as to move inside the exterior housing to thereby open or close the projection opening.

6. The projector according to claim 1, wherein on the side where the projection opening of the exterior housing is provided, a suction port and an exhaust port for flowing air that cools the inside of the projector therethrough are disposed, and in an open state, the lens cover is disposed between the projection opening and the suction port, or the projection opening and the exhaust port.

7. The projector according to claim 1, further comprising a lens shift mechanism that movably supports the projection lens in a plane that is orthogonal to an optical axis, wherein the lens cover is able to open or close the projection opening even in a state in which the projection lens is moved by the lens shift mechanism.

8. The projector according to claim 7, wherein the lens shift mechanism has an operation section that allows the projection lens to move by a user, and the operation section is operable when the lens cover is either in an open state or a closed state.

9. The projector according to claim 1, further comprising a driving section that is configured so as to be able to slide the first cover and the second cover.

10. The projector according to claim 9, wherein the driving section includes a motor and a transferring section; and the transferring section has a sliding mechanism that is configured so as to be able to open and close the lens cover by hand.

* * * * *